United States Patent
Lowe et al.

[11] Patent Number: 5,544,709
[45] Date of Patent: Aug. 13, 1996

[54] DOWN PRESSURE SPRING ADJUSTMENT

[75] Inventors: Terry L. Lowe, Ankeny; James T. Noonan, Johnston, both of Iowa

[73] Assignee: Deere & Company, Moline, Ill.

[21] Appl. No.: 422,925

[22] Filed: Apr. 17, 1995

[51] Int. Cl.[6] ..................................................... A01B 39/22
[52] U.S. Cl. ..................... 172/661; 172/624.5; 172/705; 172/736
[58] Field of Search ................................ 172/624.5, 500, 172/736, 484, 462, 497, 705, 307, 661, 734; 111/926, 54, 55, 62

[56] References Cited

U.S. PATENT DOCUMENTS

| | | | |
|---|---|---|---|
| 2,580,480 | 1/1952 | Strehlow | 180/1 |
| 2,616,348 | 11/1952 | Ariens | 172/484 X |
| 3,203,487 | 8/1965 | Whitesides | 172/624.5 X |
| 3,452,826 | 7/1969 | Lehman | 172/624.5 X |
| 3,804,179 | 4/1974 | Johnson | 172/624.5 X |
| 4,461,355 | 7/1984 | Peterson et al. | 172/156 |
| 4,766,962 | 8/1988 | Frase | 172/624.5 |
| 4,895,086 | 1/1990 | Tye, III | 111/926 X |
| 5,163,518 | 11/1992 | Foley | 172/462 |
| 5,398,771 | 3/1995 | Hornung et al. | 172/624.5 X |

FOREIGN PATENT DOCUMENTS

| | | | |
|---|---|---|---|
| 1257188 | 2/1961 | France | 172/624.5 |
| 3637972 | 5/1988 | Germany | 111/926 |
| 634706 | 11/1978 | U.S.S.R. | 111/926 |
| 2126062 | 3/1984 | United Kingdom | 111/926 |

OTHER PUBLICATIONS

Deere & Company, brochure entitled "Cultivators and Hoes, Win Your War On Weeds The Low–Cost Way", 16 pages (see particulary the front cover, pp. 10–11, and the back cover), dated Aug. 1994, published in the U.S.A.

*Primary Examiner*—Terry Lee Melius
*Assistant Examiner*—Christopher J. Novosad

[57] ABSTRACT

A series of notches are provided in the upright plates on one end of a parallel bar linkage connecting a cultivator rig or planter assembly to a tool bar. Coil springs are tensioned between the opposite end of the linkage and a rod and trunnion assembly that fits into the series of notches. The coil springs maintain the rod and trunnion in a selected set of notches. A handle on the rod allows the operator to walk the rod and trunnion assembly up and down the series of notches to select a different set of notches and thereby incrementally adjust the down pressure to a known value or setting. When the tool bar is raised to a transport position and the linkage pivots downwardly to a lowermost position, the spring is stretched only slightly so that down pressure adjustments can be made easily using only the handle on the rod.

19 Claims, 2 Drawing Sheets

DOWN PRESSURE SPRING ADJUSTMENT

BACKGROUND OF THE INVENTION

1) Field of the Invention

The present invention relates generally to agricultural earthworking implements, and, more specifically, to a down pressure spring adjustment for a parallel linkage on an implement such as a row crop cultivator or the like.

2) Related Art

Implements such as row crop cultivators or planters often utilize a parallel linkage to connect a cultivator rig or planter assembly to a transverse tool bar or frame member. To bias the rig downwardly, coil springs may be tensioned diagonally between links. Some of the previously available rigs such as the type shown in U.S. Pat. No. 4,461,355 include a threaded adjustment to vary the tension of the springs and adjust the down pressure. Threaded adjustments typically require one or more tools to change the spring tension for the desired down pressure. Making adjustments to the down pressure for various rig tool combinations and ground and crop conditions can be very time consuming and difficult.

Some pressure adjusting systems for parallel linkages have structure for moving one end of the springs along one of the links. For example, a rack and pinion arrangement such as shown in U.S. Pat. No. 4,766,962 adjusts springs along the upper link of the parallel linkage to change spring tension and thereby adjust the down pressure. Such systems require a special retaining member which adds cost and complexity to the structure, and a separate tool is necessary to make pressure adjustments.

Most rig assemblies do not have a convenient or easily readable gauge or marking to determine the spring tension setting or provide repeatable settings. Often a time consuming trial and error method is necessary to set the down pressure on a large number of rigs so that the bias on each rig is approximately the same. With some pressure adjusting systems overtensioning is possible to the extent that stresses become greater than desired when the rig is in the working position.

BRIEF SUMMARY OF THE INVENTION

It is therefore an object of the present invention to provide an improved down pressure arrangement which overcomes some or all of the aforementioned problems. It is a further object to provide such an improved down pressure arrangement which facilitates quickly adjusting several rigs to a predetermined setting or down pressure.

It is a further object of the present invention to provide an improved down pressure arrangement wherein adjustments can be made without tools. It is a further object to provide such an arrangement wherein adjustments can be made quickly and easily and wherein the preselected adjustment is maintained in a simple manner without special retainers or locking procedures. It is yet another object to provide such an arrangement wherein spring pressure during adjustment is kept to a minimum and the possibility of overstressing the rig when in the working position is minimized.

It is still another object of the present invention to provide an improved down pressure arrangement wherein down pressure can be determined easily by a visual inspection, and wherein a preselected down pressure can be repeated. It is a further object to provide such an arrangement which is relatively simple and inexpensive in construction and which does not require rack and pinion structure or screw thread adjustments.

A rig assembly constructed in accordance with the teachings of the present invention includes series of notches provided in the upright plates on one end of a four-bar linkage connecting the rig to a tool bar or frame. Coil springs are tensioned between the opposite end of the linkage and a rod and trunnion assembly that fits into the series of notches. A handle on the rod allows the operator to walk the rod and trunnion assembly up and down the series of notches to adjust the down pressure to a known value or setting. When the tool bar is raised to a transport position and the linkage pivots downwardly to a lowermost position, the spring is stretched only slightly so that a wide range of incremental down pressure adjustments can be made easily without the use of additional tools. By placing the rod and trunnion assemblies on each of a plurality of rigs in the same notch, the same down pressure can be provided for each rig. The pressure settings are easily determined by a brief visual inspection of the selected notch location, and the down pressure settings are repeatable. Spring tension retains the rod and trunnion assembly in the selected notch without need for additional securing mechanisms or locking procedures. The notch system reduces the problem of overstressing of the rig in the working position which can occur if the springs are too highly tensioned in structures with a screw thread or similar infinitely variable adjustment.

These and other objects, features and advantages of the present invention will become apparent to one skilled in the art upon reading the following detailed description in view of the drawings.

DETAILED DESCRIPTION OF THE DRAWINGS

Figure 1:
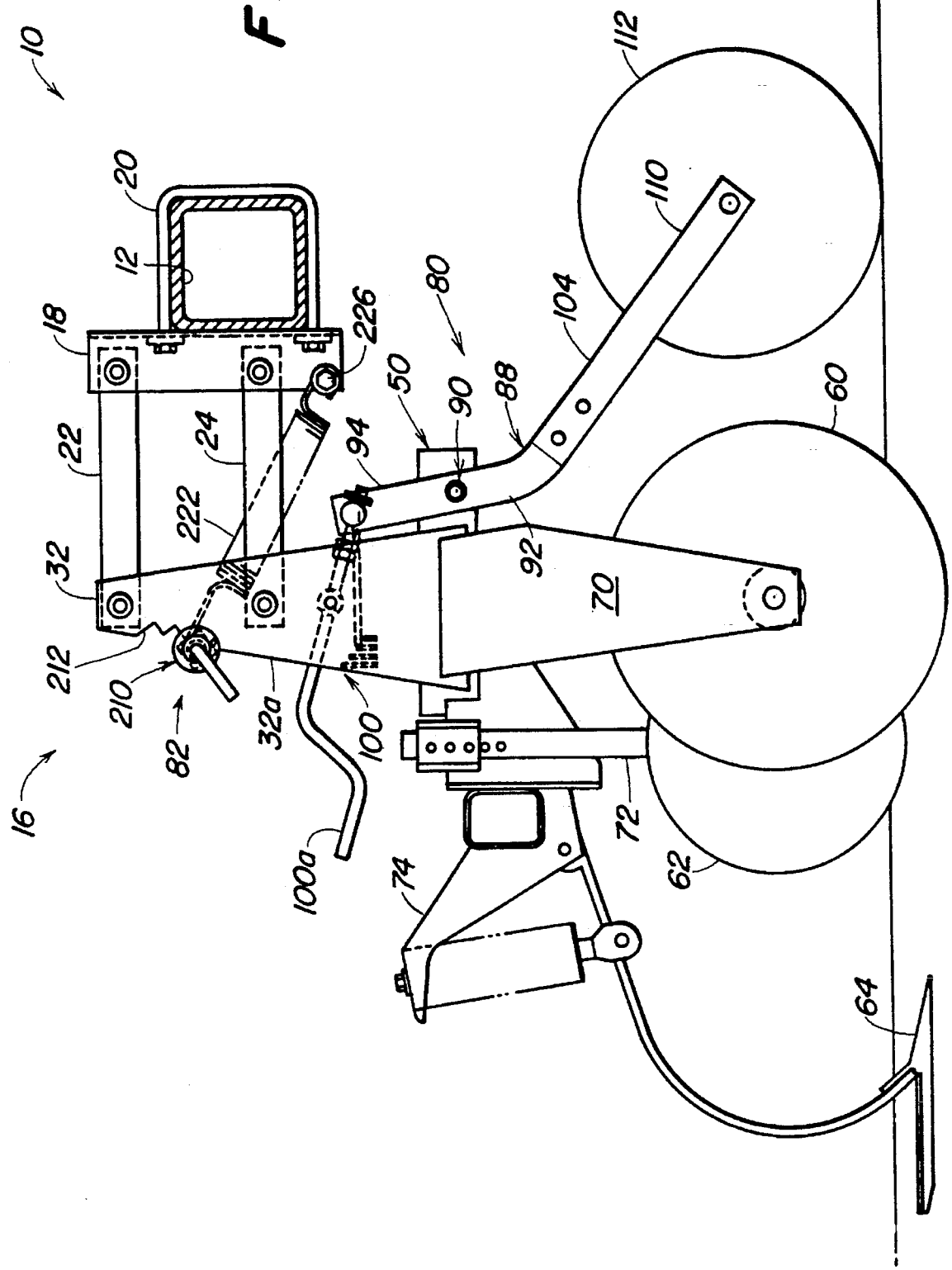
FIG. 1 is a side view of a row crop cultivator including a cultivator rig supported from a transversely extending tool bar.

Referring now to FIG. 1, therein is shown a portion of an agricultural implement 10 such as a row crop cultivator. A transversely extending implement frame or tool bar 12 is connected to conventional vertically movable hitch structure (not shown) on a tractor for forward movement over a field. A plurality of individual cultivator rigs 16 are connected by upright brackets 18 and U-bolts 20 to locations transversely spaced along the tool bar 12. A pair of fore-and-aft extending and generally parallel upper and lower arms or tubes 22 and 24 are connected at their forward ends to rearwardly extending flanges of the brackets 18. The aft ends of the arms 22 and 24 are embraced by a pair of transversely spaced, upright plates 32 and 34 (FIG. 2) pivotally connected to the arms by pivot or bushing and bolt assemblies 36 and 38. The plates 32 and 34 narrow in the upward direction and have lower apertured ends 42 and 44 which are bent towards each other and then downwardly to define a rig tube supporting area. The plates 32 and 34 include upright aft edges 32a and 34a.

Figure 2:
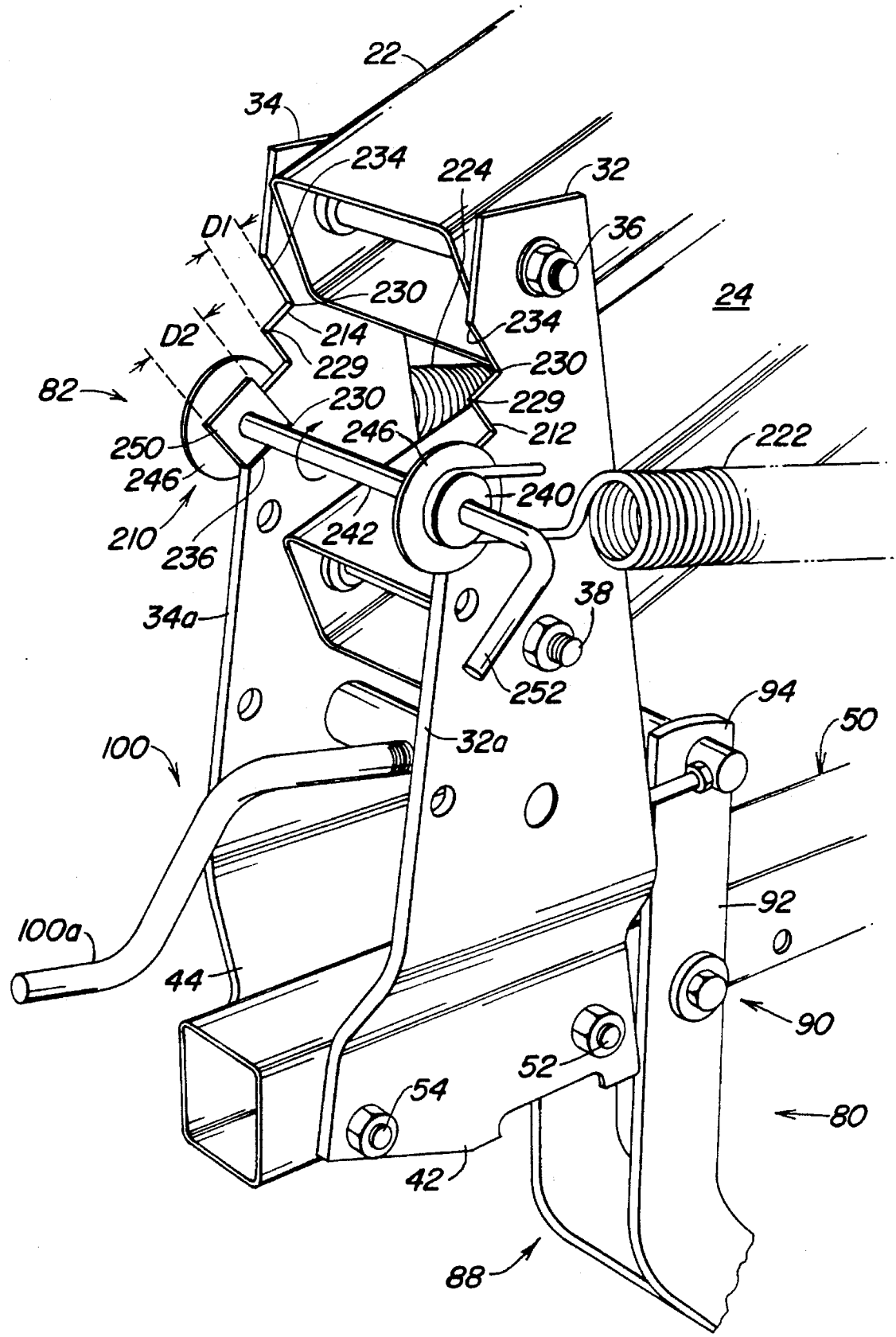
FIG. 2 is a rear side perspective view of a portion of the ring of FIG. 1.

A fore-and-aft extending rig tube 50 is supported between the lower ends 42 and 44 of the plates 32 and 34 in substantially a horizontal attitude by connecting bolts 52 and 54 (FIG. 2). A plurality of earthworking tools, such as shown at 60, 62 and 64 in FIG. 1, are supported from the rig tube 50 by tool supports 70, 72 and 74 connected by suitable brackets and/or cross tubes to the tube 50. The tube 50 projects both forwardly and rearwardly from the ends 42 and 44, with the distance of the projections being variable to accommodate numerous combinations and locations of the different tools.

An adjustable straddle mounted gauge wheel system 80, which is the subject of our copending and commonly assigned application entitled GAUGE WHEEL MOUNTING, Ser. No. 08/423,620, filed concurrently herewith, is pivotally connected near the forward end of the rig tube 50 for adjusting and controlling the working depth of the tools 60–64. An adjustable down pressure spring arrangement 82 is connected between the bracket 18 and the aft edges 32a and 34a of the side plates 32 and 34 for rig down pressure control, described in detail below.

The straddle mounted gauge wheel system 80 includes a control arm 88. A bushing assembly 90 pivotally supports a bifurcated central portion 92 of the arm 88. The arm 88 includes an upper end 94 connected to an adjustable depth control arrangement 100 located above the tube 50 for selectively pivoting the arm about the axis of the bushing assembly 90. The arm 88 also includes a forwardly directed lower end 104 with removable gauge wheel supports 110 which mount one or more ground engaging gauge wheels 112 for controlling tool depth.

The down pressure spring arrangement 82 includes an indexing member 210 which is supported for rotation along notched portions 212 and 214 of the aft edges 32a and 34a of the plates 32 and 34. Coil springs 222 and 224 are tensioned between the indexing member 210 and bolt connections 226 on the bracket 18 fixed to the tool bar 12 (FIG. 1). The springs 222 and 224 bias the rig downwardly, with the bias increasing as the rig rocks upwardly with respect to the tool bar 12. As the indexing member 210 is rotated upwardly along the edges 32a and 34a, the distance between the connections 226 and the member increases and the tension in the springs 222 and 224 is increased for a given position of the rig 16 relative to the tool bar 12. Rotating the indexing member 210 downwardly along the edges 32a and 34a decreases the distance and thus the tension in the springs for a given rig position relative to the tool bar 12.

The notched portions 212 and 214 as seen in FIG. 2 are generally of identical saw-tooth patterns with straight-edged teeth 229 defining a series of V-shaped notches 230 generally pointing in the direction of the centerlines of the springs 222 and 224 towards the respective bolt connections 226. The sides of the notches 230 have a length of approximately D1, except for upper side 234 of the uppermost notches and lower side 236 of the lowermost notches, which are longer to help prevent rotation of the indexing member from the notched portions 212 and 214. As shown, the teeth 229 are located generally between the pivot bolt assemblies 36 and 38.

The indexing member 210 includes a pair of transversely spaced trunnions 240 supported on a transversely extending rod 242 outwardly adjacent the side plates 32 and 34. The trunnions 240 are pinned to the rod 242 for rotation with the rod. The hooked ends of the springs 222 and 224 extend around the trunnions 240. The trunnions 240 include washer-like guide members 246 and are fixed to the rod 242 with the members 246 on opposite sides of the plates 32 and 34 for aligning the indexing member 210 relative to the plates. Located on the trunnions 240 at locations inwardly adjacent the washers 246 are a pair of notch-engaging members 250 which mate with the notches 230. As shown, the members 250 are square and the sides of a given notch 230 meet a right angle at the base of the notch. The members 250 are maintained in the notches 230 by the bias of the springs 222 and 224. The length of each side of the members 250 is D2, with D2 being greater than D1 (preferably, D1 is on the order of 50–60% of D2) to facilitate rotation of the member 210 from one pair of the spaced notches 230 to an adjacent pair of notches. The lengths of the sides 234 and 236 of the uppermost and lowermost notches 230 are approximately equal to or slightly larger than the dimension D2 to help prevent rotation of the member 210 out of the notched areas. The rod 242 includes a handle 252 extending at a right angle to the remainder of the rod. The handle 252 and the members 250 provide sufficient leverage so an operator can make spring tension adjustments without need for additional tools.

When the tool bar 12 (FIG. 1) is raised to a transport position so the links 22 and 24 angle downwardly (FIG. 2) to a lowermost stopped position, the springs 222 and 224 approach their relaxed position and only a small amount of tension is present to maintain the member 210 within the selected notches 230. In this lowermost position of the rig relative to the tool bar 12, the reduced spring tension also facilitates easy adjustment of the member 210 along the notches 230.

As shown, three sets of vertically spaced notches 230 are provided with the two springs 222 and 224, although the number of sets of notches and the number and location of springs can be varied. For the configuration shown, down pressure varies in a range of from about 15% to 30% as the member 210 is rotated from one set of the notches 230 to an adjacent set. The adjustments, which can be made by simply rotating the handle 252 by hand, are repeatable and easily determinable by observing the notch location of the member 210, and the operator is able to adjust several rigs 16 to the same predetermined setting or down pressure. The location of the member 210 rearwardly of the plates 32 and 34 and the springs 222 and 224 outwardly of the plates provides unencumbered area between and forwardly of the plates for the tubes 22 and 24, as well as for other assemblies such as the depth control arrangement 100. By placing a depth control handle adjacent the handle 252 as shown in FIG. 2, both adjustments can be made from the same convenient location. The above-described configuration allows a wide range of preselected down pressure adjustments to be made while limiting the possibility of a damaging over-tensioning of the springs.

Having described the preferred embodiment, it will become apparent that various modifications can be made without departing from the scope of the invention as defined in the accompanying claims. For example, although two springs 222 and 224 are shown located outwardly of the plates 32 and 34, other spring arrangements may also be used. For example, a single or double spring arrangement could be mounted between the plates 32 and 34, and the notched portions of the rear edges of the plates could be vertically offset to one side of the pivotal connections 36 and 38.

We claim:

1. In a tool supporting rig for an agricultural implement supported from a frame by a parallel bar linkage rockable about a transversely extending axis, the parallel bar linkage including upper and lower links having first ends, first pivot structure connecting the first ends to a first bracket, and second ends connected to a second bracket, a spring tensioning assembly for adjustably biasing the rig a preselected direction, the spring tensioning assembly including:

an upright notched portion supported adjacent the first pivot structure, the notched portion including vertically spaced notches of preselected configuration;

a rotatable indexing member including a mating portion generally conforming to at least a portion of the configuration of the notches;

a down pressure spring connected between the rotatable indexing member and the second bracket, the down pressure spring biasing the mating portion of the indexing member into engagement with one of the notches; and structure for selectively rotating the indexing member to move the mating portion incrementally in a vertical direction along the notches and thereby adjust the tension of the spring; wherein the notched portion comprises a saw-tooth section with straight-edged teeth extending vertically along and integral with one of the brakcets, and wherein the rotatable indexing member includes sides conforming to the area between the teeth.

2. The invention as set forth in claim 1 wherein the mating portion of the indexing member has a preselected dimension, the preselected dimension being greater than the dimension of the notches and facilitating rotation of the mating portion from one notch to an adjacent notch as the indexing member is rotated.

3. The invention as set forth in claim 2 wherein the notched portion defines a saw-tooth edge with straight-edged teeth, and wherein the mating portion of the indexing member includes straight-edged corners conforming to an area between the teeth.

4. The invention as set forth in claim 1 wherein the structure for selectively rotating the indexing member includes a handle fixed to the indexing member, the handle providing sufficient leverage for rotating the indexing member by hand wherein the handle is movable vertically with the indexing member as the indexing member is rotated.

5. The invention as set forth in claim 1 wherein the indexing member is maintained in a preselected notch substantially entirely by the bias of the spring.

6. The invention as set forth in claim 1 wherein the notched portion comprises a pair of transversely spaced vertically extending edges and the indexing member extends between the edges.

7. In a tool supporting rig for an agricultural implement supported from a frame by a parallel bar linkage rockable about a transversely extending axis, the parallel bar linkage including upper and lower links having first ends, first pivot structure connecting the first ends to a first bracket, and second ends connected to a second bracket, a spring tensioning assembly for adjustably biasing the rig a preselected direction, the spring tensioning assembly including:

an upright notched portion supported adjacent the first pivot structure, the notched portion including notches of preselected configuration;

a rotatable indexing member including a mating portion generally conforming to at least a portion of the configuration of the notches;

a down pressure spring connected between the rotatable indexing member and the second bracket, the down pressure spring biasing the mating portion of the indexing member into engagement with one of the notches;

structure for selectively rotating the indexing member to move the mating portion incrementally along the notches and thereby adjust the tension of the spring;

wherein the notched portion comprises a pair of transversely spaced edges and the indexing member extends between the edges; and wherein the spaced edges are integral with the first bracket.

8. The invention as set forth in claim 7 wherein the first ends of the upper and lower links are embraced by the first bracket and the spaced edges are offset from the first ends.

9. In a tool supporting rig for an agricultural implement supported from a frame by a parallel bar linkage rockable about a transversely extending axis, the parallel bar linkage including upper and lower links having first ends, first pivot structure connecting the first ends to a first bracket, and second ends connected to a second bracket, a spring tensioning assembly for adjustably biasing the rig a preselected direction, the spring tensioning assembly including:

an upright notched portion supported adjacent the first pivot structure, the notched portion including notches of preselected configuration;

a rotatable indexing member including a mating portion generally conforming to at least a portion of the configuration of the notches;

a down pressure spring connected between the rotatable indexing member and the second bracket, the down pressure spring biasing the mating portion of the indexing member into engagement with one of the notches;

structure for selectively rotating the indexing member to move the mating portion incrementally along the notches and thereby adjust the tension of the spring; wherein the notched portion comprises a pair of transversely spaced edges and the indexing member extends between the edges;

wherein the notched portion comprises a pair of transversely spaced edges and the indexing member extends between the edges; and wherein the spring is supported outwardly of the first bracket and the first ends of the upper and lower links are supported inwardly of the spring.

10. The invention as set forth in claim 9 wherein the notched portion extends vertically in an area generally between pivotal connections of the upper and lower links with the first bracket.

11. In a tool supporting rig for an agricultural implement rockably supported from a frame by a parallel bar linkage for vertical movement, the parallel bar linkage including upper and lower links having first ends pivotally connected to upright plate structure and second ends pivotally connected to the frame, a tool-carrying rig tube connected to the plate structure below the lower link, the links pivoting between a first position corresponding to a transport position of the rig tube and to positions corresponding to field working positions of the rig tube, a spring tensioning assembly for adjustably biasing the rig tube when the rig tube is in the field working positions, the tensioning assembly including:

an indexing member supported for vertical movement along the plate structure;

a down pressure spring tensioned between the indexing member and the frame;

means for moving the indexing member vertically along the plate structure to vary the tension in the spring; and wherein the plate structure includes a plurality of vertically spaced notches and the down pressure spring biases the indexing member into engagement with the notches.

12. The invention as set forth in claim 11 wherein the means for moving the indexing member includes a handle for rotating the indexing member to move the member along the notches and thereby adjust the tension of the spring to preselected incremental tension levels dependent on location of the indexing member.

13. The invention as set forth in claim 11 including a depth control supported between the upright plate structure adjacent the indexing member to thereby facilitate depth control and down pressure adjustments at one location on the rig tube.

14. The invention as set forth in claim 11 wherein the vertically spaced notches are located rearwardly adjacent pivotal connections of the first ends of the links, generally between the pivotal connections of the upper and lower links to the upright plate structure.

15. In a tool supporting rig for an agricultural implement rockably supported from a frame by a parallel bar linkage for vertical movement, the parallel bar linkage including upper and lower links having first ends pivotally connected to upright plate structure and second ends pivotally connected to the frame, a tool-carrying rig tube connected to the plate structure below the lower link, the links pivoting between a first position corresponding to a transport position of the rig tube and to positions corresponding to field working positions of the rig tube, a spring tensioning assembly for adjustably biasing the rig tube when the rig tube is in the field working positions, the tensioning assembly including:

an indexing member supported for vertical movement along the plate structure;

a down pressure spring tensioned between the indexing member and the frame;

means for moving the indexing member vertically along the plate structure to vary the tension in the spring; and wherein the indexing member extends outwardly from the plate structure and the down pressure spring is located outwardly of the plate structure.

16. The invention as set forth in claim 15 including two down pressure springs located outwardly adjacent the plate structure.

17. In an agricultural implement having a frame, a linkage having one end pivotally connected to the frame and an opposite end connected to tool support structure, and a spring with proximate and distal ends, the spring connected at its distal end to a spring-mounting location and at its proximate end to the tool support structure for biasing the tool support structure in a preselected direction, tension adjusting structure for varying the bias in the preselected direction, the tension adjusting structure including:

an indexing area located on the tool support structure and defining discrete locations at varying distances from the spring-mounting location;

a rotatable member supported by the tool support structure for movement relative to the indexing area and including indexing structure maintaining the rotatable member at one of the discrete locations;

wherein the proximate end of the spring is connected to the rotatable member for movement therewith relative to the indexing area so that the distance between the distal end and proximate end of the spring and thus the tension in the spring is dependent upon the location of the rotatable member along the path; and wherein the tension in the spring biases the indexing structure into engagement with the indexing area on the tool support structure and maintains a preselected adjusted tension position independently of additional securing mechanisms.

18. The invention as set forth in claim 17 wherein the indexing area includes a notched area and wherein the rotatable member includes a member conforming to the notched area and movable incrementally from one of the discrete locations to another to thereby incrementally adjust the tension in the spring.

19. The invention as set forth in claim 18 wherein the spring biases the rotatable member into contact with the indexing area and retains the indexing structure at a discrete location.

* * * * *